(12) United States Patent
Hao et al.

(10) Patent No.: US 8,369,333 B2
(45) Date of Patent: Feb. 5, 2013

(54) METHOD AND APPARATUS FOR TRANSPARENT CLOUD COMPUTING WITH A VIRTUALIZED NETWORK INFRASTRUCTURE

(75) Inventors: Fang Hao, Morganville, NJ (US); Tirunell V. Lakshman, Morganville, NJ (US); Sarit Mukherjee, Marlboro, NJ (US); Haoyu Song, Edison, NJ (US)

(73) Assignee: Alcatel Lucent, Paris (FR)

( * ) Notice: Subject to any disclaimer, the term of this patent is extended or adjusted under 35 U.S.C. 154(b) by 592 days.

(21) Appl. No.: 12/582,939

(22) Filed: Oct. 21, 2009

(65) Prior Publication Data

US 2011/0090911 A1 Apr. 21, 2011

(51) Int. Cl.
*H04L 12/56* (2006.01)

(52) U.S. Cl. ........ 370/392; 370/409; 709/242; 709/245; 709/249

(58) Field of Classification Search .......................... None
See application file for complete search history.

(56) References Cited

U.S. PATENT DOCUMENTS

| | | | | |
|---|---|---|---|---|
| 7,865,586 | B2* | 1/2011 | Cohn | 709/223 |
| 8,175,103 | B2* | 5/2012 | Germain et al. | 370/401 |
| 2003/0055933 | A1* | 3/2003 | Ishizaki et al. | 709/223 |
| 2007/0140263 | A1 | 6/2007 | Mitome et al. | |
| 2008/0144644 | A1* | 6/2008 | Allan et al. | 370/401 |
| 2008/0240122 | A1* | 10/2008 | Richardson et al. | 370/401 |
| 2008/0310417 | A1* | 12/2008 | Friskney et al. | 370/392 |
| 2009/0161669 | A1* | 6/2009 | Bragg et al. | 370/389 |

FOREIGN PATENT DOCUMENTS

| | | |
|---|---|---|
| GB | 2 458 154 A | 9/2009 |
| WO | WO 2008/118797 A1 | 10/2008 |

OTHER PUBLICATIONS

Global Environment for Network Innovations. http//www.geni.net, 2006.
M. Caesar et al., "Design and Implementation of a Routing Control Platform." In Networked Systems Design and Implementation, 2005.
D. A. Joseph et al., "A Policy-Aware Switching Layer for Data Centers." In ACM SIGCOMM, 2008.
T. Lakshman et al., "The Soft Router Architecture." In ACM HOTNETS, 2004.

(Continued)

*Primary Examiner* — Brian Roberts
(74) *Attorney, Agent, or Firm* — Wall & Tong, LLP

(57) ABSTRACT

A capability is provided for providing transparent cloud computing with a virtualized network infrastructure. A method for enabling use of a resource of a data center as an extension of a customer network includes receiving, at a forwarding element (FE), a packet intended for a virtual machine hosted at an edge domain of the data center, determining a VLAN ID of the VLAN for the customer network in the edge domain, updating the packet to include the VLAN ID of the VLAN for the customer network in the edge domain, and propagating the updated packet from the FE toward virtual machine. The edge domain supports a plurality of VLANs for a respective plurality of customer networks. The packet includes an identifier of the customer network and a MAC address of the virtual machine. The VLAN ID of the VLAN for the customer network in the edge domain is determined using the identifier of the customer network and the MAC address of the virtual machine. The FE may be associated with the edge domain at which the virtual machine is hosted, an edge domain of the data center that is different than the edge domain at which the virtual machine is hosted, or the customer network. Depending on the location of the FE at which the packet is received, additional processing may be provided as needed.

20 Claims, 5 Drawing Sheets

OTHER PUBLICATIONS

N. McKeown et al., "Openflow: Enabling Innovation in Campus Networks," http//www.openflowswitch.org/wp/documents/,2008.

"Juniper Networks. Logical Router Overflow." http://www.juniper.net/techpubs/software/junos/junos73/swconfig73-routing/html/logical-router-overview.html.

J. Rexford et al., "Network-Wide Decision Making: Toward a Wafer-Thin Control Plane." In ACM SIGCOMM HotNets Workshop, 2004.

I.Stoica et al., "Internet Indirection Infrastructure," In ACM SIGCOMM, 2002.

N. Farrington et al., "Scaling Data Center Switches Using Commodity Silicon and Optics," In ACM SIGCOMM, 2008.

C. Guo et al.,"DCell: A Scalable and Fault-Tolerant Network Structure for Data Centers," In ACM SIGCOMM, 2008.

T. Wood et al., "The Case for Enterprise-Ready Virtual Private Clouds." In HotCloud, 2009.

F. Hao et al., "Enhancing Dynamic Cloud-Based Services Using Network Virtualization," in VISA, 2009.

C. Guo et al., "BCube: A High Performance, Server-Centric Network Architecturefor Modular Data Centers," In ACM SIGCOMM, 2009.

A.Greenberg et al., *VL2: A Scalable and Flexible Data Center Network.* In ACM SIGCOMM, 2009.

R. Mysore et al., et al. "PortLand: A Scalable Fault-Tolerant Layer 2 Data Center Network Fabric." In ACM SIGCOMM, 2009.

J. Touch and R. Perlman, "RFC 5556: Transparent Interconnection of Lots of Links (TRILL): Problem and Applicability Statement." http://www.ietf.org,2009.

International Search Report and The Written Opinion of the International Searching Authority, or the Declaration in PCT/US2010/051570, Alcatel-Lucent USA Inc., Applicant, mailed Apr. 29, 2011, 12 pages.

* cited by examiner

US 8,369,333 B2

METHOD AND APPARATUS FOR TRANSPARENT CLOUD COMPUTING WITH A VIRTUALIZED NETWORK INFRASTRUCTURE

FIELD OF THE INVENTION

The invention relates generally to the field of cloud computing and, more specifically but not exclusively, to providing transparent cloud computing for customer networks.

BACKGROUND

Cloud computing is a paradigm of computing in which cloud resources of a cloud service provider may be utilized by cloud clients, which may include individual users and enterprises. The cloud resources of a cloud service provider may include cloud services, cloud applications, cloud platforms, cloud infrastructure, and the like, as well as various combinations thereof. For example, existing cloud computing solutions include Amazon EC2, Microsoft Azure, and Google AppEngine, among others.

The cloud computing model is reshaping the landscape of Internet-provided services, especially given its beneficial nature for individual users and large enterprises alike. For example, for a home user of a home network, having a server that requires use of an additional server to run a particular application, cloud computing is an attractive option since the home user does not have to commit to the cost of purchasing an additional server; rather, the home user merely rents a virtual server from the cloud service provider. For example, for an enterprise, having existing network infrastructure periodically requiring additional resources to accommodate variations in resource demand, cloud computing is an attractive option since the enterprise does not have to commit to hardware purchase costs; rather, the enterprise need only pay the cloud service provider for actual usage of cloud resources.

Disadvantageously, however, the existing cloud computing model lacks a mechanism to effectively integrate resources of the cloud service provider with existing resources of the customer networks. Rather, in the existing cloud computing model, there is a clear boundary demarcating a customer network from cloud-based resources used by the customer network This boundary is maintained primarily due to the fact that the devices within the cloud and the devices in the customer networks are in different IP address domains and, thus, there may be conflicts where the IP address domain employed by the cloud service provider overlaps with IP address domains of customer networks (especially where customer applications utilize a combination of resources of the customer network and resources of the cloud service provider).

As such, while providing physically separate networks for different customers can ensure isolation of IP address domains, such a solution is highly inefficient and inflexible and, therefore, there is a need for a mechanism to effectively integrate the resources of a cloud service provider with existing resources of customer networks.

SUMMARY

Various deficiencies in the prior art are addressed by embodiments that support transparent cloud computing with a virtualized network infrastructure, which enables various resources of a data center to be used as extensions of customer networks. The data center includes a core domain and a plurality of edge domains. The edge domains host resources of the data center. The core domain facilitates communications within the data center. The edge domains interface with the core domain using forwarding elements and, similarly, the customer networks interface with the core domain using forwarding elements. The forwarding elements are controlled using a central controller of the data center. The forwarding elements and the central controller support various capabilities for forwarding packets associated with the customer networks in a manner that enables customer networks to use resources of the data center in an efficient, secure, and transparent manner.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
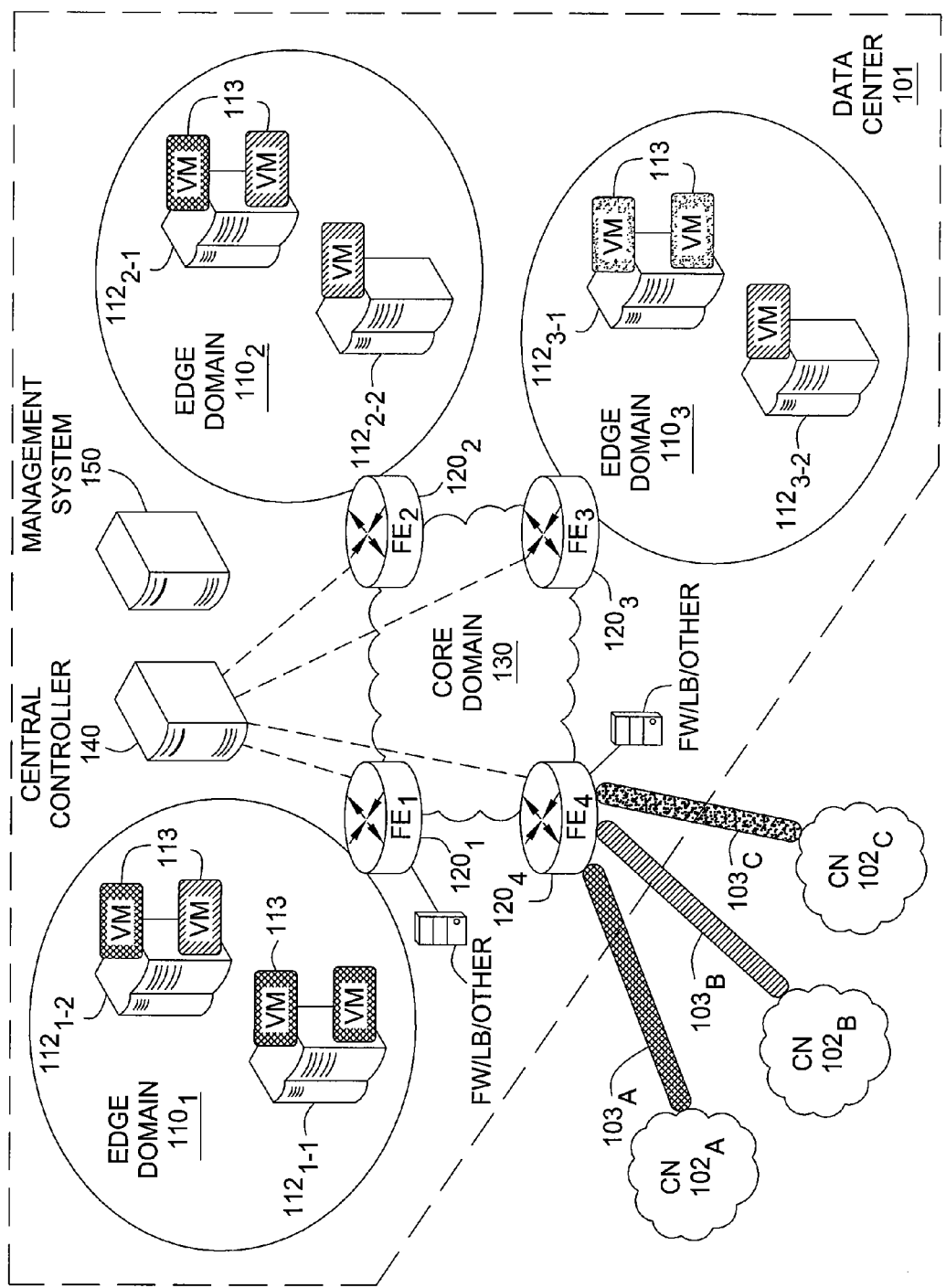
FIG. 1 depicts a high-level block diagram of a communication system architecture.

An integrated Elastic Cloud Computing (iEC2) architecture is depicted and described herein. The iEC2 architecture enables cloud computing resources to be a transparent extension to existing customer infrastructure, thereby enabling customer applications to utilize both customer computing resources and cloud computing resources in a seamless and flexible manner without any modification to existing customer infrastructure. The iEC2 architecture enables cloud computing resources to be a transparent extension to existing customer infrastructure by using network virtualization to instantiate virtual extensions of customer networks within the cloud. The iEC2 architecture enables seamless integration of cloud computing resources with existing customer infrastructure without requiring any modification of the existing customer infrastructure. The iEC2 architecture enables such extended customer networks to grow and shrink with demand, thereby obviating the need for customers to deploy network infrastructure which may only be needed temporarily. The iEC2 architecture enables cloud computing resources to be a transparent extension to existing customer infrastructure in a highly scalable manner, such that cloud computing resources may be utilized by a very large number customers (e.g., any types of customers ranging from individual customers having home networks to large enterprise customers having enterprise networks, rather than existing cloud computing architectures which can only accommodate a small number of customers). The iEC2 architecture enables dynamic customization of the data center for different customers (e.g., dynamic customization of data forwarding, policy control, and like features).

The iEC2 architecture enables network virtualization to be provided. The network virtualization is provided using two types of entities: Forwarding Elements (FEs) and a Central Controller (CC). In general, the FEs perform packet handling functions (e.g., address mapping, policy checking and enforcement, packet forwarding, and the like), while the CC maintains and provides control information adapted for use by the FEs in performing the packet handling functions (e.g., configuration information, address mapping, policies, and the like). The FEs may be implemented as Ethernet switches having enhanced APIs that enable them to be controlled remotely by the CC. The iEC2 architecture, unlike in typical network virtualization solutions, does not require deployment of specialized routers or switches across the entire data center network; rather, the FEs are deployed only at certain chosen points of the data center network in order to provide the virtualization functions, while conventional, off-the-shelf Ethernet switches can be used in most parts of the data center network.

The iEC2 architecture utilizes a hierarchical network structure within the data center network, in which multiple edge domains communicate via a central core domain. The edge domains each include physical hosts (for providing cloud computing resources within the edge domain) connected via one or more switches. The edge domains each provide a number of functions, such as resolving packet addresses (e.g., for resolving the edge domain/layer two address to which a packet should be forwarded), isolating packets of different customers within the edge domain, determining forwarding of packets based on intended destination (e.g., forwarding locally within the edge domain, or toward the core domain for forwarding toward another edge domain), policy checking and enforcement, and the like. The edge domains each are connected to the core domain via one or more FEs (i.e., FEs are deployed as gateways between the edge domains and the core domain, while the CC is associated with the core domain for purposes of communicating with the FEs for providing configuration and control functions for the FEs). The customer networks may be treated as special instances of edge domains, in which case each customer network may access the data center network via one or more FEs (where such FEs are referred to as customer-facing FEs (CN-facing FEs) that see the customer network(s) as local LANs). The FEs may have processing devices associated therewith, such as firewalls, load balancers, and the like, for providing policy treatment of packets traversing the FEs. The core domain may be a flat layer-two network adapted for forwarding packets between edge domains.

In the iEC2 architecture, a customer is provided one or more virtual networks isolated from virtual networks of other customers. The virtual network(s) of a customer may be provided in one edge domain or spread across multiple edge domains, with the underlying domain structure being hidden from the customer. In each edge domain, VLANs are utilized locally within the edge domain to isolate different customers that are utilizing resources within the edge domain, and, further, VLAN IDs are reused across edge domains, thereby providing a significant increase in the number of customers which may be supported by the data center network. When a customer network spans multiple edge domains, the customer network may be assigned different VLAN IDs in each of the multiple edge domains and, packets forwarded across edge domains, such VLAN IDs are remapped by the gateway FEs between the edge domains and the core domain.

As described herein, the iEC2 architecture enables seamless integration of cloud computing resources with customer networks, thereby enabling customers to utilize cloud computing resources without modification of the customer networks. The seamless integration of cloud computing resources with customer networks may be achieved using an addressing scheme for logically isolating customer networks within the data center network. A description of one exemplary embodiment of such an addressing scheme follows.

The addressing scheme includes a mechanism for differentiating between different customers, by which each customer network is assigned a unique customer network identifier (referred to herein as a cnet identifier). In the case of a customer having a single VLAN, the cnet identifier also identifies the customer. In the case of a customer having multiple VLANs, use of a different cnet identifier for each VLAN ensures that the VLAN structure of the customer may be preserved (which may be desirable or even necessary, such as where different policy controls are applicable for different VLANs). In this manner, logically, a virtual machine can be identified using a combination of (cnet identifier, IP address). The combination of (cnet identifier, IP address) is mapped to a unique layer two MAC address for the virtual machine. In host virtualization platforms that support assignment of virtual MAC addresses to virtual machines, the unique layer two MAC address for the virtual machine directly identifies the virtual machine, even where other virtual machines may be hosted on the physical server. In host virtualization platforms that do not support assignment of virtual MAC addresses to virtual machines, the layer two MAC address assigned to the virtual machine is the same as the MAC address assigned to the physical server and, thus, an additional identifier is required for purposes of identifying the virtual machine on the physical server. In this case, the additional identifier may be a pseudo MAC address generated for the virtual machine, which is used for virtual machine identification purposes but not for packet forwarding purposes.

The addressing scheme includes a mechanism for separating different customers within each edge domain. In addition to using layer two and layer three addresses, VLANs are used to separate different customers within each edge domain. In each edge domain, each customer is mapped to a different VLAN. If a customer has multiple VLANs that use the cloud computing service, each of the internal VLANs of the customer is mapped to a different VLAN in the edge domain. For each edge domain, VLAN configuration is performed at the FE(s) 120 associated with the edge domain, at the Ethernet switch(es) using for forwarding packets within the edge domain, and at the host hypervisors of the physical servers within the edge domain. The VLAN configurations in the edge domains are transparent to the virtual machines, such that applications that run on the virtual machines are not aware of the VLAN configurations.

The addressing scheme includes a mechanism for enabling edge domains to reuse VLAN IDs. VLAN tagging scope is limited within the edge domains. By enabling edge domains to reuse VLAN IDs, the limit on the number of customers that may be accommodated by the data center network is eliminated. While this design implicitly imposes a limit on the number of virtual machines that can be supported in each edge domain (e.g., in the worst case, when each virtual machine belongs to a different customer in the edge domain, there can be a maximum of 4000 virtual machines in each edge domain; although, in general, edge domains are likely to be able to support many more virtual machines since many customers are likely to use multiple virtual machines), there is no limit on the number of edge domains that may be supported within the data center and, thus, there is no limit on the number of customers that may be supported.

The above-described addressing scheme enables seamless integration of cloud computing resources with customer networks, while at the same time isolating customer networks, and enables preservation of the IP address spaces of the customers, respectively. This ensures that servers of different customers can be differentiated, even when they utilize the same IP address, without requiring use of physically separate networks for each customer within the data center.

The above-described addressing scheme may be modified while still providing an iEC2 architecture that enables seamless integration of cloud computing resources with customer networks in a manner that prevents the need for any modification of the customer networks.

The above-described addressing scheme may be better understood by way of reference to the exemplary iEC2 architecture depicted and described with respect to FIG. 1.

The foregoing description of the iEC2 architecture is merely a general description provided for purposes of introducing the iEC2 architecture and, thus, the iEC2 architecture is not limited in view of this description. A more detailed description of the iEC2 architecture, and its various associated embodiments, follows.

FIG. 1 depicts a high-level block diagram of a communication system architecture. As depicted in FIG. 1, communication system architecture 100 is an exemplary iEC2 architecture including a data center (DC) 101 providing cloud computing resources for a plurality of customer networks (CNs) $102_A$-$102_C$ (collectively, CNs 102).

The data center 101 includes cloud computing resources which may be made available for use by customers (e.g., where customers may lease or purchase cloud computing resources). The cloud computing resources are provided to customers such that they are considered to be extensions of the customer networks of those customers. The cloud computing resources may include any types of computing resources which may be made available to customers, such as processing capabilities, memory, and the like, as well as various combinations thereof.

The data center 101 includes network infrastructure adapted for use in facilitating use of cloud computing resources by customers. The DC 101 includes a plurality of edge domains (EDs) $110_1$-$110_3$ (collectively, EDs 110), a plurality of forwarding elements (FEs) $120_1$-$120_4$ (collectively, FEs 120), and a core domain (CD) 130. The DC 101 also includes a central controller (CC) 140 and, optionally, a management system (MS) 150. The various elements of DC 101 cooperate to perform various functions for enabling customers to utilize cloud computing resources available from DC 101.

The CNs 102 may utilize cloud computing resources of DC 101 without modification of the CNs 102. The CNs 102 may include any types of customer networks, e.g., from home networks of individual customers to enterprise networks of large enterprise customers. In other words, CNs 101 may be any customer networks which may make use of cloud computing resources of DC 101. The CNs 102 access DC 101 using one or more of the FEs 120 of DC 101.

A description of the various components of DC 101 which enable CNs 102 to access cloud computing resources follows.

The EDs 110 enable a significant increase in the number of CNs 102 which may be supported by DC 101. As described herein, each ED 110 is capable of supporting a set of VLANs for customers independent of each of the other EDs 110. In this manner, rather than the DC 101 being constrained by the number of VLANs that may be supported (and, thus, the number of CNs 102 which may be supported), only each of the individual EDs 110 is constrained by the number of VLANs that may be supported and, thus, the number of CNs 102 which may be supported; however, from the perspective of DC 101, this per-ED limitation on the number of CNs 102 which may be supported is artificial in that any number of EDs 110 may be supported by DC 101.

The EDs 110 each include physical servers 112 for use by customers associated with CNs 102 (illustratively, ED $110_1$ includes two physical servers $112_{1-1}$ and $112_{1-2}$, ED $110_2$ includes two physical servers $112_{2-1}$ and $112_{2-2}$, and ED $110_3$ includes two physical servers $112_{3-1}$ and $112_{3-2}$, where the physical servers are referred to collectively as physical servers 112). The physical servers 112 each host cloud computing resources which may be utilized by CNs 102. The physical servers 112 may be any servers suitable for supporting such cloud computing resources, which may depend on the type(s) of cloud computing resources being made available for use by CNs 102.

The PSs 112 each include one or more virtual machines (VMs) 113 which may be utilized by CNs 102. For each PS 112 supporting multiple VMs 113, the VMs 113 of the PS 112 may be implemented using any virtualization technique(s) suitable for logically separating different customer networks on the physical server 112 (and thus, for making different portions of the same physical hardware available for use by different customers in a transparent, secure, and cost-effective manner).

The VMs 113 are virtual machines configured on PSs 112. The VMs 113 provide cloud computing resources which may be configured on PSs 112 for use by CNs 102. The cloud computing resources include any resources which may be utilized by CNs 102, such as processor resources, memory resources, and the like, as well as various combinations thereof.

In the exemplary network of FIG. 1, three customers have VMs 113 provisioned within DC 101 for use by CNs 102 of the three customers. The first CN $102_A$ has four VMs 113 provisioned within DC 101 (namely, two VMs 113 on PS $112_{1-1}$ of ED $110_1$, one VM 113 on PS $112_{1-2}$ of ED $110_1$, and one VM 113 on PS $112_{2-1}$ of ED $110_2$). The second CN $102_B$ also has four VMs 113 provisioned within DC 101 (namely, one VM 113 on PS $112_{1-2}$ of ED $110_1$, one VM 113 on PS $112_{2-1}$ of ED $110_2$, one VM 113 on PS $112_{2-2}$ of ED $110_2$, and one VM 113 on PS $112_{3-2}$ of ED $110_3$). The third CN $102_C$ has two VMs 113 provisioned within DC 101 (namely, two VMs 113 on PS $112_{3-1}$ of ED $110_3$). From these exemplary customers, it will be appreciated that VMs 113 may be provisioned within DC 110 in many different configurations (e.g., a customer may utilize one physical server, multiple physical servers within the same edge domain, multiple physical servers across the different edge domains, and the like, and, further, a customer may utilize one or more VMs on any given physical server).

The EDs 110 each include communication infrastructure for routing packets within EDs 110. In one embodiment, EDs 110 may utilize switches to perform packet forwarding within EDs 110. For example, EDs 110 each may utilize one or more Ethernet switches. In one embodiment, since the switches in each ED 110 need to handle different VLANs for different customers, the switches in each ED 110 may be configured in a conventional tree-based topology (e.g., rooted at FEs 120 associated with EDs 110, respectively). It will be appreciated that EDs 110 may be implemented using other types of network elements and other associated communication capabilities.

The EDs 110 each have one or more FEs 120 associated therewith. The FEs 120 operate as gateways between EDs 110 and CD 130. It will be appreciated that while one FE 120 per ED 110 is sufficient for the network virtualization functions to be supported within DC 101, multiple FEs 120 may be used to interface EDs 110 with CD 130 for purposes of load balancing, improved reliability, and the like.

The FEs 120 perform packet handling functions (e.g., address lookup and mapping, policy checking and enforcement, packet forwarding and tunneling, and the like) for packets associated with DC 101. The FEs 120 function as gateways between CNs 102 and CD 130 and between EDs 110 and CD 130. The FEs 120 include CN-facing FEs (illustratively, FE $120_4$ which operates as a gateway in DC 101 for each of the CNs 102) and ED-facing FEs (illustratively, FEs $120_1$, $120_2$, and $120_3$ which operate as gateways between EDs $110_1$, $110_2$, and $110_3$, and CD 130, respectively). The operation of the FEs 120 in facilitating communications for CNs 102 and EDs 110 is described in additional detail hereinbelow.

The FEs 120 perform address lookup and mapping functions. The address lookup and mapping may be performed by an FE 120 using mapping information stored in the local storage of the FE 120 and/or by requesting the required mapping information from CC 140 (e.g., such as where the required mapping information is not available from the local storage of the FE 120). The mapping information which may be stored locally and/or requested from CC 140 includes any mapping information required for performing the packet handling functions (e.g., such as the virtual machine MAC ↔ (cnet identifier, IP address) mapping, the virtual machine MAC ↔ edge domain identifier mapping, the edge domain identifier ↔ FE MAC list mapping, and the (cnet identifier, edge domain identifier) ↔ VLAN identifier mapping described herein as being maintained by CC 140).

The FEs 120 may perform policy checking and enforcement functions. The policies may be general policies enforced by the data center operator and/or customer policies enforced for customers. The policy checking and enforcement functions may be provided using policy information, which may be stored locally on the FEs 120 and/or requested from CC 140 by the FEs 120 (e.g., where the required policy information is not available locally on the FEs 120). For example, the FEs 120 may process packets to ensure that MAC address, IP address, VLAN IDs, and the like are consistent for the source and destination of the packet. For example, the FEs 120 may apply customer policies (e.g., forwarding packets to firewalls before delivery, utilizing load balancers, and the like). It will be appreciated that FEs 120 may check and enforce any other suitable data center operator and/or customer policies.

The FEs 120 perform packet forwarding functions. The address lookup and mapping functions may be utilized in conjunction with the packet forwarding functions. For example, FEs 120 may forward packets originating from CNs 102 that are intended for processing by virtual machines within DC 101, forward packets originating from virtual machines within DC 101 that are intended for CNs 102, forward packets originating from virtual machines within DC 101 that are intended for other virtual machines within DC 101, forward control packets exchanged within DC 101 (e.g., such as packets conveying provisioning information mapping information, and the like), and the like.

As may be seen from these exemplary packet flows, FEs 120 may receive packets from EDs 110 and forward the packets via CD 130, receive packets from CD 130 and forward the packets to EDs 110, receive packets from EDs and forward the packets back within the same EDs 110, and the like. The FEs 120 may perform such packet forwarding using any suitable packet forwarding capabilities.

In one embodiment, a source FE 120 receiving a packet from a CN 102 or an ED 110 for forwarding to a destination ED 110 via CD 130 tunnels the packet across CD 130 using tunneling. In one such embodiment, the source FE tunnels the packet using MAC-in-MAC tunneling. In MAC-in-MAC tunneling, the source FE 120 adds an outer MAC header to the Ethernet frame (the header of the Ethernet frame being the internal header), the modified Ethernet frame is routed by the Ethernet switches of CD 130 using the outer MAC header, and the destination FE 120 removes the outer MAC header. It will be appreciated that most Ethernet switches allow larger frame sizes to be used, such that the additional bytes of the outer MAC header will not cause any issues within CD 130 (especially in CD 130, where higher capacity Ethernet switches may be deployed to meet the traffic demands of all of the EDs 110). It will be appreciated that any other suitable type of tunneling may be used.

In one embodiment, an FE 120 receiving a packet for delivery within the ED 110 with which the FE 120 is associated (e.g., to a VM 113), forwards the packet within the ED 110 using the MAC address of the VM 113, the IP address of the VM 113, and the VLAN ID of the CN 102 with which the packet is associated. The packet may be routed through the ED 110 via one or more Ethernet switches deployed within the ED 110 for facilitating communications between the FE 120 and the VMs 113 hosted within the ED 110. It will be appreciated that this type of packet forwarding may be performed for packets received at the FE 120 via CD 130 and for packets originating from within the ED 110 with which the FE 120 is associated (i.e., intra-ED communications).

The FEs 120 perform such functions using any information suitable for performing such functions. As indicated hereinabove, the FEs 120 may access such information in any suitable manner. For example, the FEs 120 may store such information locally (e.g., packet forwarding entries, customer policy rules, and the like) and/or receive such information from one or more remote sources of such information (e.g. via signaling with other FEs 120, via requests to CC 140, and the like).

The FEs 120 may support various other capabilities in addition to the address lookup and mapping functions, the policy checking and enforcement functions, and the packet forwarding functions.

The FEs 120 may be implemented in any suitable manner. In one embodiment, FEs 120 may be implemented as switches. In one such embodiment, for example, FEs 120 may be implemented as high capacity Ethernet switches supporting such capabilities. The FEs 120 also may support enhanced APIs adapted for enabling the FEs 120 to be controlled remotely by CC 140.

In one embodiment, one or more of the FEs 120 may have one or more additional network elements associated therewith for use in performing various packet processing functions (e.g., firewalls, load balancers, and the like). For example, FE $120_1$ has a firewall and load balancer associated therewith for use in processing packets (e.g., processing packets received from CNs 102 before routing of the packets within DC 101), and FE $120_4$ has a firewall and load balancer associated therewith for use in processing packets (e.g., processing packets received at FE $120_1$ from CD 120 before routing of the packets within ED $110_1$ and/or processing packets received at FE $120_1$ from ED $110_1$ before routing of the packets toward CD 120).

The CD 130 facilitates communications within DC 101. The CD 130 facilitates communications associated with FEs 120. For example, CD 130 facilitates communications between CNs 102 and EDs 110, between EDs 110, between FEs 120, between FEs 120 and data center controllers (e.g., such as between FEs 120 and CC 140 and between FEs 120 and MS 150), and the like, as well as various combinations thereof. The CD 130 also facilitates communications between CC 140 and other components of DC 101 (e.g., FEs 120, VMs 113, and the like) and, optionally, between MS 150 and other components of DC 101 (e.g., FEs 120, VMs 113, and the like).

The CD 130 includes communication infrastructure for routing packets within CD 130. The CD 130 may be implemented in any suitable manner. In one embodiment, CD 130 may utilize switches to perform packet forwarding within CD 130. In one such embodiment, for example, CD 130 may utilize one or more Ethernet switches. It will be appreciated that, since the switches in CD 130 primarily are used for packet forwarding, the design of the switching fabric of CD 130 is not limited by any policy. In one embodiment, in order to ensure better resource usage, shortest-path frame routing, or other suitable schemes that allow use of multiple paths, may be implemented within CD 130. It will be appreciated that CD 130 may be implemented using any other suitable type of network elements and associated communication capabilities.

The CC 140 cooperates with FEs 120 to enable FEs 120 to provide the packet forwarding functions for DC 101. The CC 140 may determine provisioning information for use in provisioning the FEs 120 to support customer requests for computing resources of DC 101, and may provide such provisioning information to the FEs 120. The CC 140 may maintain mapping information adapted for use by FEs 120 in forwarding packets for DC 101, and may provide such mapping information to the FEs 120. The CC 140 may maintain policy information adapted for use by FEs 120 in enforcing customer policies while forwarding packets for DC 101, and may provide such policy information to the FEs 120.

In one embodiment, CC 140 maintains the following mapping information adapted for use by FEs 120 in forwarding packets for DC 101:

(1) virtual machine MAC↔(cnet identifier, IP address) mapping: This mapping maps the MAC address of a VM 113 to a combination of a customer network identifier (cnet identifier) of a customer for which the VM 113 is provisioned and an IP address of the VM 113. Where each customer has its own independent IP space, the (cnet identifier, IP address) also uniquely identifies the VM 113;

(2) virtual machine MAC↔edge domain identifier mapping: This mapping maps the MAC address of a VM 113 to the identifier of the ED 110 within which that VM 113 is hosted. As noted hereinabove, CNs 102 are considered as special edge domains and, thus, each CN 102 also is assigned an edge domain identifier;

(3) edge domain identifier↔FE MAC list mapping: This mapping maintains an association between the MAC address(es) of the FE(s) 120 to which the ED 110 connects. As noted hereinabove, it is possible for an ED 110 to have multiple FEs 120, e.g., for load balancing reasons, reliability reasons, and the like.

(4) (cnet identifier, edge domain identifier)↔VLAN identifier mapping: This mapping maps a combination of a customer network identifier and edge domain identifier to a VLAN identifier for the customer (since a customer may access VMs 113 in multiple EDs 110). In other words, each CN 102 is allocated a VLAN identifier in each ED 110 having one or more VMs 113 of the customer, where the VLAN identifiers for a given CN 102 may be different in different EDs 110. The VLAN identifiers in DC 101 may be allocated by CC 140 (or any other element(s) suitable for performing such allocation). The VLAN identifiers used in CNs 102 are allocated by the respective customers.

In one embodiment, at least a portion of this mapping information that is maintained by CC 140 also may be stored within each of the FEs 120 such that the FEs 120 may utilize such mapping information locally for performing packet forwarding, rather than the FEs 120 having to continually query CC 140 for such mapping information.

In one embodiment, CC 140 maintains policy information adapted for use by FEs 120 in enforcing customer policies while forwarding packets for DC 101. The policies may include any suitable policy rules. For example, a policy rule for a customer may be that all packets must first be forwarded from the associated CN-facing FE 120 to a firewall before being forwarded to the destination. In this case, the source FE 120 that enforces this policy will tunnel the packets to the firewall before the packets are ultimately forwarded toward the destination FE 120.

The CC 140 may maintain the information in any suitable manner (e.g., maintaining the information using one or more databases, storing the information in any suitable format, and the like, as well as various combinations thereof). The CC 140 may provide the information to FEs 120 in any suitable manner, e.g., periodically, in response to queries from FEs 120, and the like, as well as various combinations thereof.

Although primarily depicted and described herein with respect to use of a single CC 140 within DC 101, it will be appreciated that standard reliability and scalability techniques may be used for providing the functions of CC 140 within DC 101. The functionality of CC 140 may be distributed in any suitable manner. In one embodiment, for example, different EDs 110 may be managed by different CCs. In one embodiment, for example, different customers may be assigned to different CCs (e.g., using a Distributed Hash Table (DHT)). It will be appreciated that, since management and policy control are relatively independent for different customer networks, such partitioning of the functionality of CC 140 does not affect the functionality of CC 140.

In one embodiment, FEs 120 and CC 140 cooperate as a distributed router(s), in which FEs 120 are simplified packet forwarding elements and CC 140 provides centralized control of FEs 120. The use of such a distributed router architecture provides various advantages for DC 101, simplifying management of resources and policies within DC 101. In one embodiment, FEs 120 and CC 140 together form a VICTOR, as depicted and described in U.S. patent application Ser. No. 12/489,187, entitled "PROVIDING CLOUD-BASED SERVICES USING DYNAMIC NETWORK VIRTUALIZATION, filed Jun. 22, 2009 which is incorporated by reference herein in its entirety.

The MS 150 provides a customer front-end by which customers may request computing resources of DC 101. For example, a customer may access MS 150 remotely in order to request that computing resources of DC 101 be made available for use by the CN 102 of that customer. The customer may specify various parameters associated with the request for computing resources, such as type of resources, amount of resources, duration of resource usage/availability, and the like, as well as various combinations thereof. The MS 150, based upon a request for computing resources, signals one or more of the FEs 120 to provision the FE(s) 120 to support the request for computing resources, or signals CC 140 to signal one or more of the FEs 120 to provision the FE(s) 120 to support the request for computing resources. The provisioning may be performed immediately (e.g., where the request indicates that the computing resources are to be used immediately), may be scheduled to be performed at a later time (e.g., where the request indicates that the computing resources are to be used at a later time), and the like. The MS 150 also may provide various network management functions within DC 101.

Although primarily depicted and described with respect to a data center having specific types, numbers, and arrangements of network elements, it will be appreciated that the data center may be implemented using different types, numbers, and/or arrangements of network elements. For example, although primarily depicted and described with respect to use of a single FE 120 to connect an ED 110 to CD 130, it will be appreciated that one or more EDs 110 may be connected to CD 130 via multiple FEs 120 (e.g., for load-balancing, reliability, and the like). For example, although primarily depicted and described with respect to use of a single CC 140, the functionality of CC 140 may be spread across multiple CCs 140. It will be appreciated that various other modifications may be made.

As described herein, DC 101 enables the CNs 102 to utilize cloud computing resources of DC 101 without modification of the CNs 102.

The CNs 102 may include any types of customer networks, e.g., from home networks of individual customers to enterprise networks of large enterprise customers. In other words, CNs 101 may be any customer networks which may make use of cloud computing resources of DC 101.

The CNs 102 may communicate with DC 101 using any suitable means of communication (e.g., Virtual Private LAN Services (VPLS), Multi-Protocol Label Switching (MPLS), and the like).

In one embodiment, DC 101 and CN 102 communicate using VPLS. In one such embodiment, in which a CN 102 communicates with DC 101 using VPLS via provider edge (PE) routers of an Internet Service Provider (ISP), a customer edge (CE) device within the CN 102 connects to a first VPLS PE router of the ISP and the CE-acting FE 120 of DC 101 that is associated with CN 102 connects to a second VPLS PE router of the ISP. For the CE devices at the ends, the associated PE router appears as a local Ethernet switch. In one further embodiment, in order to avoid scalability issues that may arise (e.g., since different ports need to be allocated at both the CE device and PE router interfaces for different customers, so that the total number of customers that can be supported by PEs and CE-acting FEs is limited by the number of ports), QinQ encapsulation is used between the CE-acting FE and the PE routers, thereby enabling each port to support up to 4000 customers and, thus, significantly increasing the numbers of customers that can be supported. It will be appreciated that VPLS may be utilized to support communications between DC 101 and CNs 102 in any other suitable manner.

In one embodiment, DC 101 and CN 102 communicate using MPLS. In one such embodiment, in which both DC 101 and CN 102 get network connections from the same Internet Service Provider (ISP), MPLS may be used as the underlying transport, and bandwidth may be provisioned for better quality of service. In another such embodiment, in which DC 101 and CN 102 get network connections from different Internet Service Providers (ISPs), one or more other encapsulation protocols may be utilized for traversing layer three networks (e.g., such as using Generic Routing Encapsulation (GRE) or other encapsulation protocols that are suitable for traversing layer three networks). It will be appreciated that MPLS may be utilized to support communications between the DC 101 and the CNs 102 in any other suitable manner.

In one embodiment, for individual users or small businesses, Layer 2 Tunneling Protocol (L2TP)/Internet Protocol Security (IPSec) may be used between the DC 101 and the CN 102 in order to provide basic connectivity and security without assistance from network service providers.

It will be appreciated that communications between DC 101 and CNs 102 may be implemented using any other suitable types of communications capabilities.

As described herein, the iEC2 architecture enables integration of cloud computing resources with customer networks, thereby enabling customers to utilize cloud computing resources without modification of the customer networks. The utilization of cloud computing resources of the data center by customer networks requires exchanging of packets between the data center and the customer networks, as well as exchanging of packets within the data center. A description of different data forwarding paths utilized for providing cloud computing services in the iEC2 architecture follows.

In utilizing the cloud computing service, a device in a CN 102 may send a packet to a VM 113 in DC 101. For purposes of clarity in describing the data flow, assume for this example that a packet is sent from a device in CN 102$_A$ to the VM 113 that is hosted on PS 112$_{1-2}$ in ED 110$_1$ for CN 102$_A$. The packet is forwarded from CN 102$_A$ to the CN-facing FE 120$_4$ associated with CN 102$_A$. The packet is received at CN-facing FE 120$_4$ associated with CN 102$_A$. The packet received at CN-facing FE 120$_4$ includes the MAC address and IP address of intended VM 113. The CN-facing FE 120$_4$ ensures that the MAC address of intended VM 113 that is included in the packet is consistent with the combination of (cnet id, IP address) using the virtual machine MAC$\leftrightarrow$(cnet identifier, IP address) mapping. The CN-facing FE 120$_4$ determines the ED 110 hosting the VM 113 for which the packet is intended (which, in this example, is ED 110$_1$ that is hosting intended VM 113 for CN 102$_A$) by using the MAC address from the packet to access the virtual machine MAC$\leftrightarrow$edge domain identifier mapping. The CN-facing FE 120$_4$ determines the MAC address of one of the FEs 120 of the identified ED 110 hosting the VM 113 for which the packet is intended (which, in this example, is FE 120$_1$ serving ED 110$_1$) by using the determined edge domain identifier to access the edge domain identifier$\leftrightarrow$FE MAC list mapping. The CN-facing FE 120$_4$ modifies the received packet to include the determined MAC address of the one of the FEs 120 of the ED 110 hosting the VM 113 for which the packet is intended (which, in this example, is the MAC address of FE 120$_1$ serving ED 110$_1$). For example, CN-facing FE 120$_4$ may append the determined MAC address of FE 110$_1$ as an outer header of the received packet to form a modified packet. The CN-facing FE 120$_4$, optionally, also may access policy information for the customer and apply the policy information as appropriate (e.g., forwarding the packet to FE 110$_1$ via a firewall associated with FE 110$_4$ or applying any other applicable policy rules) prior to forwarding the modified packet and/or as part of forwarding the modified packet. The CN-facing FE 120$_4$ forwards the modified packet toward FE 110$_1$ via CD 130. The CD 130 propagates the modified packet based on the MAC address of FE 110$_1$ which is used as the outer header of the modified packet (i.e., the modified packet is tunneled from FE 110$_4$ to FE 110$_1$ via CD 130 using MAC-in-MAC tunneling). The FE 110$_1$ receives the modified packet via CD 130. The FE 110$_1$ removes the outer header of the modified packet to obtain the packet. The FE 110$_1$ propagates the packet toward the VM 113 for which the packet is intended via ED $110_1$. The FE $110_1$ and ED $110_1$ propagate the packet using (a) the VLAN ID of the CN $102_A$ within ED $110_1$ and (b) the MAC address of the VM 113 for which the packet is intended. The VM 113 for which the packet is intended receives the packet. The VM 113 processes the received packet for CN $102_A$. In this data forwarding flow, propagation of the packet within ED $110_1$, which is hosting the VM 113 for which the packet is intended, is performed using the VLAN ID of CN $102_A$ within ED $110_1$. As such, the VLAN ID of CN $102_A$ within ED $110_1$ must be determined within DC 101 and the packet must be modified to include the determined VLAN ID of CN $102_A$ within ED $110_1$. The VLAN ID may be determined and inserted into the packet by the source FE (in this example, FE $120_4$) or by the destination FE (in this example, FE $120_1$) using the (cnet identifier, edge domain identifier) ↔ VLAN identifier mapping, because both the source and destination FEs know the cnet identifier of CN $102_A$ and the edge domain identifier of ED $110_1$ which is hosting the VM 113 for which the packet is intended. With respect to determining the VLAN ID, the following configurations may be used: (a) if the DC 101 is configured such that the source FE is always responsible for determining and inserting the VLAN ID on behalf of the destination FE, the destination FE may always assume that a packet received via CD 130 includes the VLAN ID required for delivery of the packet within the associated ED (i.e., the destination FE does not have to determine whether or not the received packet includes the proper VLAN ID); or (b) if the DC 101 is not configured such that the source FE is always responsible for determining and inserting the VLAN ID on behalf of the destination FE, the destination FE, upon receiving a packet via CD 130, will determine whether or not the received packet includes a VLAN ID and (b1) if the received packet does not include a VLAN ID, the destination FE will determine the VLAN ID using the (cnet identifier, edge domain identifier)↔VLAN identifier mapping and will insert the determined VLAN ID into the packet, or (b2) if the received includes a VLAN ID, the destination FE will either assume that the VLAN ID is valid, or will determine the VLAN ID using the (cnet identifier, edge domain identifier)↔VLAN identifier mapping and compare it to the VLAN ID included within the received packet such that the VLAN ID in the packet may be replaced with the determined VLAN ID if the compared VLAN IDs do not match.

In utilizing the cloud computing service, a VM 113 in DC 101 may send a packet to a device in a CN 102. The data forwarding flow in this case is very similar to the data forwarding flow of the above-described case in which a CN 102 sends a packet to a VM 113 in DC 101, because each CN 102 is essentially a special edge domain.

In utilizing the cloud computing service, a first VM 113 in DC 101 may send a packet to a second VM in DC 101. If the first VM 113 and second VM 113 are in different EDs 110, the data forwarding flow in this case is very similar to the data forwarding flow of the above-described case in which a CN 102 sends a packet to a VM 113 in DC 101. If the first VM 113 and second VM 113 are in the same ED 110 but associated with different VLANs, the packet must be delivered via one of the FEs 120 associated with the ED 110 such that the one of the FEs 120 associated with the ED 110 may translate the VLAN ID and, optionally, perform policy checking and enforcement. If the first VM 113 and second VM 113 are in the same ED 110 and associated with the same VLAN, the packet from a source VM 113 can be delivered directly to a destination VM 113 (i.e., without a requirement that the packet traverse the FE 120), because address lookup and mapping and policy checking and enforcement are not required.

In one or more of the above-described data forwarding flows, an ARP process may be employed for learning MAC addresses. This enables the source devices of the packets in the data forwarding flows described above to know the MAC address of the destination device for which the packets are intended.

In such embodiments, the ARP process may be applied before the first packet is received at a source FE 120 from an end point (e.g., from a device in CN 102 or from a VM 113) or in response to the first packet being received at a source FE 120 from an end point (e.g., from a device in CN 102 or from a VM 113).

In such embodiments, the ARP flow is similar to the data forwarding flows described above. For purposes of clarity in describing the ARP flow, the ARP flow is described within the context of the data forwarding flow in which a device in a CN 102 wants to send a packet to a VM 113 in DC 101 (although it will be appreciated that the ARP process is applicable to other types of data forwarding flows). For further purposes of clarity in describing the ARP flow, assume for this example that a device in CN $102_A$ wants to sent a packet to the VM 113 hosted on PS $112_{1-2}$ in ED $110_1$ for CN $102_A$, but does not know the MAC address of the VM 113 hosted on PS $112_{1-2}$ in ED $110_1$ for CN $102_A$. In this case, in order to learn the MAC address, the device in CN $102_A$ initiates an ARP request packet. The ARP request packet is forwarded from CN $102_A$ to the CN-facing FE $120_4$ associated with CN $102_A$. The ARP request packet is received at CN-facing FE $120_4$ associated with CN $102_A$. The ARP request packet received at CN-facing FE $120_4$ includes the cnet id of CN $102_A$ and the IP address of the intended VM 113, but not the MAC address of the intended VM 113. The CN-facing FE $120_4$ determines the MAC address of intended VM 113 using the virtual machine MAC↔ (cnet identifier, IP address) mapping. At this point, it will be appreciated that, while the CN-facing FE $120_4$ now has sufficient information to response to the ARP request (and, thus, could do so), switches typically do not response to ARP messages (rather, they simply forward ARP messages for processing by end devices). Thus, CN-facing FE $120_4$ determines the ED 110 hosting the VM 113 for which the packet is intended (which, in this example, is ED $110_1$ that is hosting intended VM 113 for CN $102_A$) by using the determined MAC address of the VM 113 to access the virtual machine MAC↔ edge domain identifier mapping. The CN-facing FE $120_4$ determines the MAC address of one of the FEs 120 of the identified ED 110 hosting the VM 113 for which the packet is intended (which, in this example, is FE $120_1$ serving ED $110_1$) by using the determined edge domain identifier to access the edge domain identifier↔FE MAC list mapping. The CN-facing FE $120_4$ modifies the received ARP request packet to include the determined MAC address of the one of the FEs 120 of the ED 110 hosting the VM 113 for which the packet is intended (which, in this example, is the MAC address of FE $120_1$ serving ED $110_1$). For example, CN-facing FE $120_4$ may append the determined MAC address of FE $110_1$ as an outer header of the ARP request packet to form a modified ARP request packet. The CN-facing FE $120_4$ forwards the modified ARP request packet toward FE $110_1$ via CD 130. The CD 130 propagates the modified ARP request packet based on the MAC address of FE $110_1$ which is used as the outer header of the modified ARP request packet (i.e., the modified ARP request packet is tunneled from FE $110_4$ to FE $110_1$ via CD 130 using MAC-in-MAC tunneling). The FE $110_1$ receives the modified ARP request packet via CD 130. The FE 110₁ removes the outer header of the modified ARP request packet to obtain the ARP request packet. The FE 110₁ broadcasts the ARP request packet within the VLAN that exists within ED 110₁ for CN 102_A. The VLAN ID may be determined by CN-facing FE 120_A or FE 110₁. The VM 113 for which the ARP request packet is intended (i.e., the VM 113 having an IP address matching the IP address that is included in the ARP request packet) generates an ARP response packet including its MAC address. The VM 113 propagates the ARP response packet to FE 110₁ via ED 110₁. The FE 110₁ tunnels the ARP response packet back to CN-facing FE 120_A associated with CN 102_A. The CN-facing FE 120_A associated with CN 102_A tunnels the ARP response packet back to the device in CN 102_A that initiated the ARP request packet. The ARP response packet includes the MAC address of VM 113, which the device in CN 102_A may then use to send packets to VM 113 as described hereinabove with respect to the data forwarding flows. It will be appreciated that the ARP flow described above is similar to the data forwarding flows described hereinabove.

As described hereinabove, a number of different data forwarding flows may be supported by the data center. Thus, it will be appreciated that each of the FEs 120 may perform a number of different methods having various steps for purposes of forwarding packets. Three such exemplary methods are depicted and described with respect to FIG. 2, FIG. 3, and FIG. 4; however, it will be appreciated that various other methods including different combinations of such steps may be supported.

Figure 2:
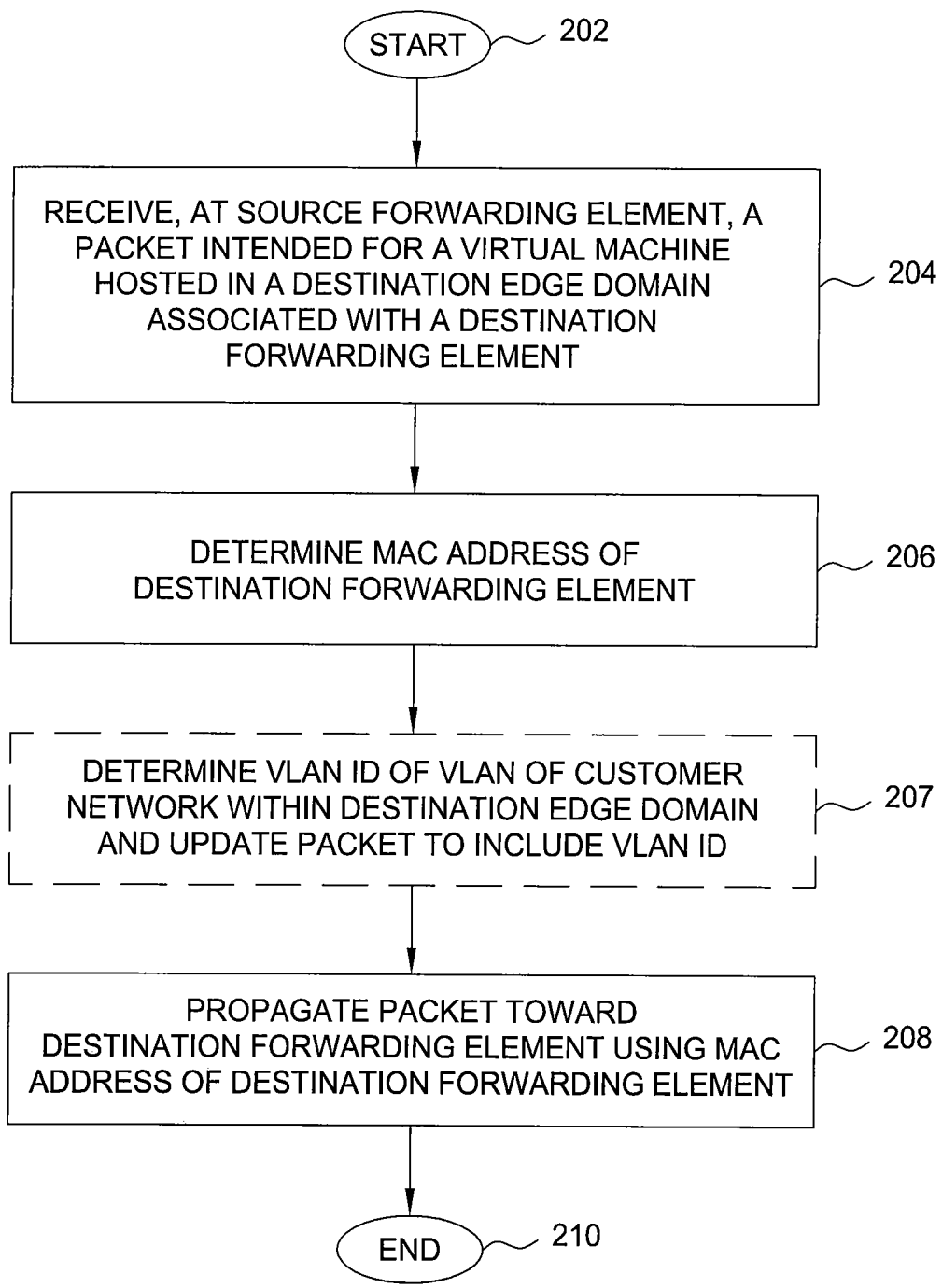
FIG. 2 depicts one embodiment of a method for processing a packet at a source forwarding element, where the packet is intended for a virtual machine hosted in a destination edge domain having a destination forwarding element associated therewith.

FIG. 2 depicts one embodiment of a method for processing a packet at a source forwarding element, where the packet is intended for a virtual machine hosted in a destination edge domain having a destination forwarding element associated therewith.

At step 202, method 200 begins.

At step 204, a packet is received at the source FE, which is associated with a CN or a source ED. The packet is intended for a VM in a destination ED that has a destination FE associated therewith. The packet includes a cnet id, an IP address of the VM, and a MAC address of the VM.

At step 206, the MAC address of the destination FE associated with the destination ED is determined. The MAC address of the destination FE is determined using a virtual machine MAC↔edge domain identifier mapping and the edge domain identifier↔FE MAC list mapping. The virtual machine MAC↔edge domain identifier is used to determine the ED identifier of the destination ED, which is then used to access the edge domain identifier↔FE MAC list mapping to determine MAC address of the destination FE.

At step 207 (optionally, e.g., where the VLAN ID of the VLAN for the CN within the destination ED is added to the packet before forwarding of the packet through the CD), the VLAN ID of the VLAN for the CN within the destination ED is determined and the packet is updated to include the determined VLAN ID of the VLAN for the CN within the destination ED.

At step 208, the packet (i.e., the original packet or the updated packet, depending on whether step 207 is performed) is propagated from the source FE toward the destination FE using the MAC address of the destination FE (e.g., using MAC-in-MAC tunneling).

At step 210, method 200 ends.

Figure 3:
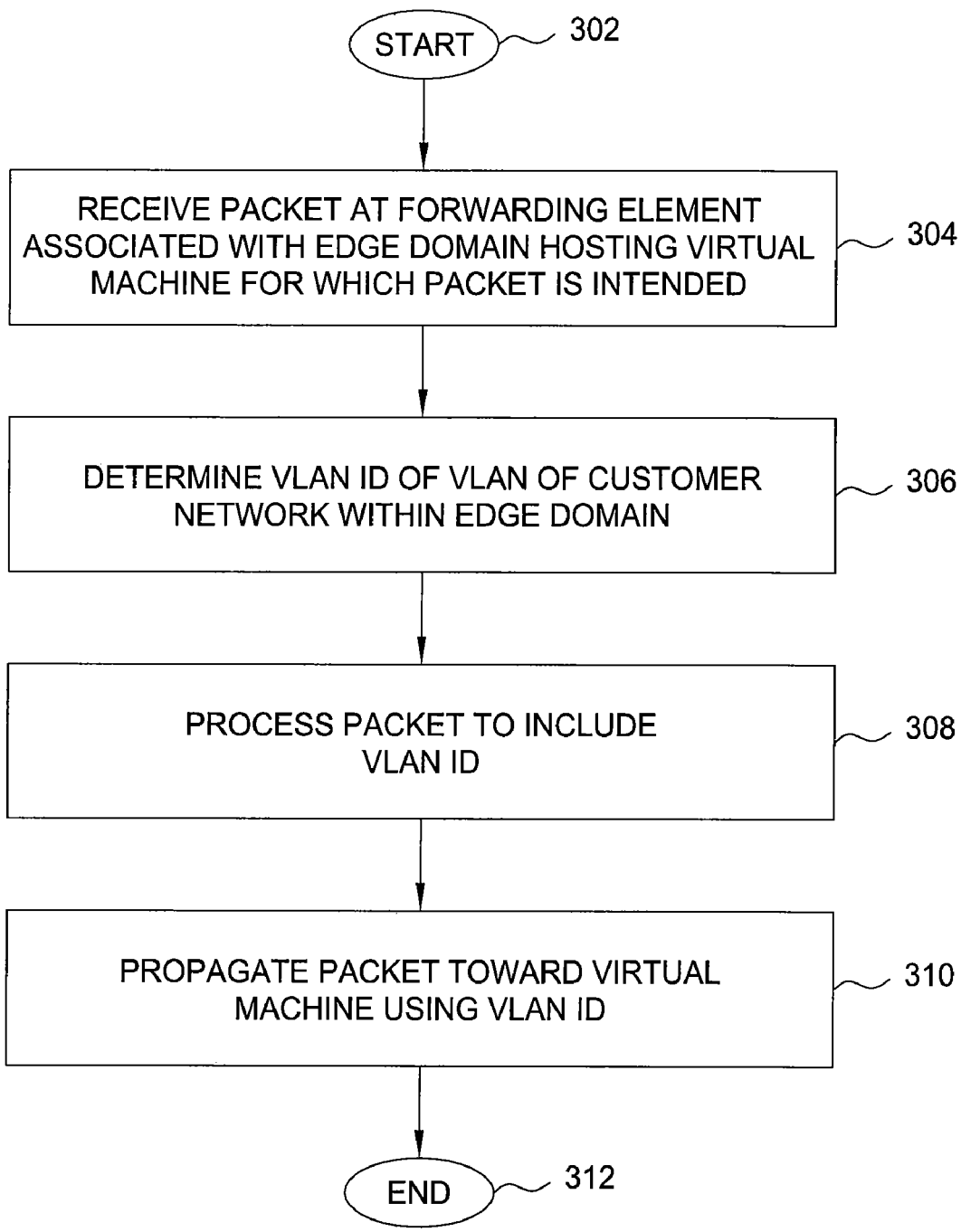
FIG. 3 depicts one embodiment of a method for processing a packet at a forwarding element associated with an edge domain hosting a virtual machine for which the packet is intended, where an assumption is made that the forwarding element always determines the VLAN ID of the VLAN of the CN within the edge domain.

FIG. 3 depicts one embodiment of a method for processing a packet at a forwarding element associated with an edge domain hosting a virtual machine for which the packet is intended, where an assumption is made that the forwarding element always determines the VLAN ID of the VLAN of the CN within the edge domain. This assumption may be based on the manner in which the data center is implemented and/or configured.

At step 302, method 300 begins.

At step 304, a packet is received at an FE is associated with an ED hosting a VM for which the packet is intended. The packet includes a cnet id, an IP address of the VM, and a MAC address of the VM. The packet optionally includes a VLAN ID, which may or may not be the correct VLAN ID for the VLAN of the CN within the ED (e.g., depending on whether or not FEs associated with source EDs and/or CNs are configured to determine the VLAN ID for the packet before forwarding of the packet through the CD).

At step 306, the VLAN ID of the VLAN for the CN within the ED is determined. The VLAN ID is determined using the (cnet identifier, edge domain identifier)↔VLAN identifier mapping, where the cnet identifier is determined from the packet and the edge domain identifier may be determined in any suitable manner.

At step 308, the packet is processed to include the determined VLAN ID.

In one embodiment, where received packets do not include VLAN IDs, processing may include inserting the determined VLAN ID within the packet.

In one embodiment, where each received packet already includes a VLAN ID, processing may include determining whether the VLAN ID in the packet matches the determined VLAN ID and either leaving the VLAN ID of the packet unchanged if they match or replacing the VLAN ID of the packet with the determined VLAN ID if they do not match.

In one embodiment, where a received packet may or may not include a VLAN ID (and an assumption is made that any received packet including a VLAN ID includes the correct VLAN ID for the CN within the ED), processing may include determining whether the received packet includes a VLAN and either leaving the VLAN ID of the packet unchanged if the received packet includes a VLAN ID or replacing the VLAN ID of the packet with the determined VLAN ID if the received packet does not include a VLAN ID.

In one embodiment, where a received packet may or may not include a VLAN ID (and an assumption is not made that any received packet including a VLAN ID includes the correct VLAN ID for the CN within the ED), processing may include a combination of determining whether the packet includes a VLAN ID and, if so, determining whether the VLAN ID in the packet is the correct VLAN ID for the CN within the ED, as well as leaving the VLAN ID of the packet unchanged, replacing the VLAN ID of the packet with the determined VLAN ID, or inserting the determined VLAN ID into the packet as appropriate.

In any event, regardless of the manner in which the processing is implemented, the received packet is ultimately processed to ensure that it includes the correct VLAN ID.

At step 310, the packet is propagated from the FE toward the VM using the VLAN ID and the MAC address of the VM.

At step 312, method 300 ends.

Figure 4:
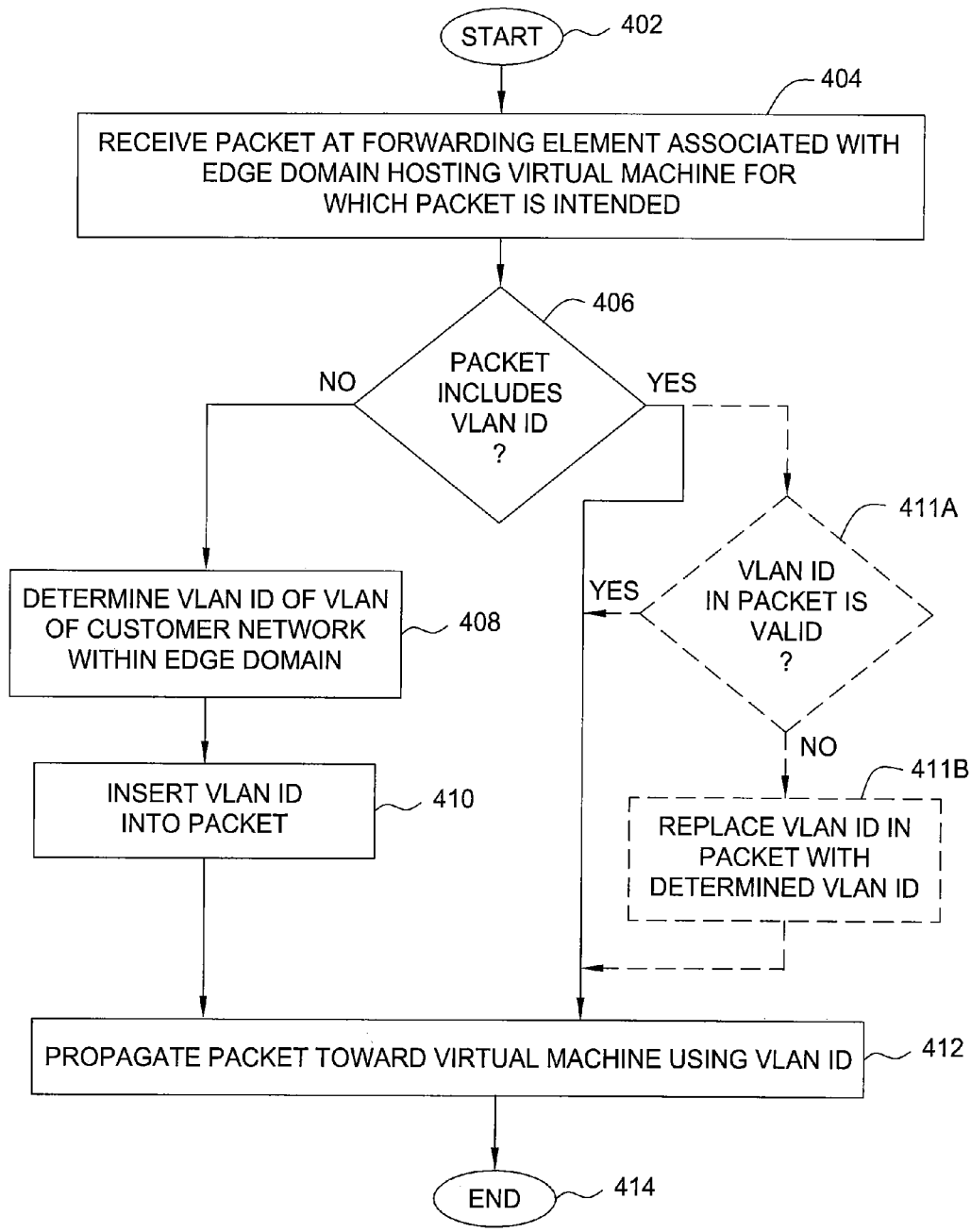
FIG. 4 depicts one embodiment of a method for processing a packet at a forwarding element associated with an edge domain hosting a virtual machine for which the packet is intended, where an assumption is not made that the forwarding element always determines the VLAN ID of the VLAN of the CN within the edge domain.

FIG. 4 depicts one embodiment of a method for processing a packet at a forwarding element associated with an edge domain hosting a virtual machine for which the packet is intended, where an assumption is not made that the forwarding element always determines the VLAN ID of the VLAN of the CN within the edge domain. This assumption may be based on the manner in which the data center is implemented and/or configured.

At step 402, method 400 begins.

At step 404, a packet is received at an FE is associated with an ED hosting a VM for which the packet is intended. The packet includes a cnet id, an IP address of the VM, and a MAC address of the VM. The packet optionally includes a VLAN ID, which may or may not be the correct VLAN ID for the VLAN of the CN within the ED (e.g., depending on whether or not FEs associated with source EDs and/or CNs are configured to determine the VLAN ID for the packet before forwarding of the packet through the CD).

At step 406, a determination is made as to whether or not the packet includes a VLAN ID.

If the packet does not include a VLAN ID, method 400 proceeds to steps 408 and 410, in succession. At step 408, the VLAN ID of the VLAN for the CN within the ED is determined. The VLAN ID is determined using the (cnet identifier, edge domain identifier)↔ VLAN identifier mapping, where the cnet identifier is determined from the packet and the edge domain identifier may be determined in any suitable manner. At step 410, the packet is updated to include the determined VLAN ID. From step 410, method 400 proceeds to step 412.

If the packet includes a VLAN ID, method 400 optionally proceeds to one or more of steps 411 (where there is no assumption that the VLAN ID in the packet is valid) or, otherwise, proceeds directly to step 412 (where there is an assumption that the VLAN ID in the packet is valid). At optional step 411A, a determination is made as to whether or not the VLAN ID in the packet is valid (e.g., by determining the VLAN ID of the VLAN for the CN within the ED using information from the packet and one or more mappings and comparing the determined VLAN ID to the VLAN ID included in the packet). If the VLAN ID in the packet is valid, method 400 proceeds from step 411A to step 412. If the VLAN ID in the packet is not valid, method 400 proceeds to step 411B, at which point the VLAN ID in the packet is replaced by the determined VLAN ID, and method 400 proceeds to step 412.

At step 412, the packet is propagated from the FE toward the VM using the VLAN ID and the MAC address of the VM.

At step 414, method 400 ends.

Although primarily depicted and described as being performed serially, at least a portion of one or more of above-described methods 200, 300, and 400 may be performed contemporaneously, or in a different order than depicted and described with respect to FIGS. 2, 3, and 4, respectively.

As described herein, customers may utilize data center resources to transparently provide extensions to customer networks. The iEC2 architecture enables customers to obtain layer 2 and/or layer 3 network extensions.

In layer 2 network extension, the virtual servers in the data center are logically in the same LAN as the customer servers in the customer network. This is beneficial, because certain applications may require that the servers running the application be part of the same LAN. This also is beneficial, because it is easier to migrate virtual servers within the same LAN. In general, layer 2 extension is typically more flexible than layer 3 extension.

In layer 3 network extension, the virtual servers in the data center are not in the same subnet as the customer network. The customer may have one or more subnets within the data center. In general, layer 3 networks may be needed for having more servers, for policy reasons, and the like.

In one embodiment, in order to support layer 3 extensions for customers, FEs 120 and CC 140 may support additional router functions. The additional router functions may include, for each customer for which layer 3 extensions are supported, enabling at least one virtual router to be allocated for the customer, where the virtual router(s) peers with the outer(s) of the customer network. In this arrangement, data is forwarded by FEs 120, and the routing protocol is run at CC 140.

With respect to providing different types of extensions, it will be appreciated that migration within the data center is independent of network layers because virtual servers are made location independent (i.e., they can run at any physical hosts), whereas migration between customer networks and the data center across different subnets is more challenging. In one embodiment, migration between customer networks and the data center across different subnets may be performed by deploying, at the edge of the customer network, an FE that is adapted to register the location of the virtual server and to tunnel packets to/from FEs within the data center.

As depicted and described hereinabove, the iEC2 architecture provides a number of advantages over existing cloud-based computing architectures.

The iEC2 architecture provides effective isolation between different customer networks. This includes supporting private IP address spaces of customers (which may be potentially overlapping across customers), isolating traffic of customers, and providing like isolation functions. This also may include performing resource allocation such that no customer can impact the resource usage of any other customer in an uncontrolled manner.

The iEC2 architecture provides transparency for customers, such that the underlying infrastructure of the data center is transparent to the customers. In this manner, each customer has a logical view of its own network, including cloud computing resources in the data center, independent of the actual implementation of the data center. This provides numerous advantages, including simplification of administration for the customers, improved security for the customers, and the like.

The iEC2 architecture provides location independence for customers. The virtual servers and networks for the customers may be physically located anywhere within the data center. This provides numerous advantages, including improvement of resource utilization, simplification of provisioning, and the like.

The iEC2 architecture provides easy customer policy control, enabling customers to configure policy settings on the fly, enforce policy settings in the network, and the like. This is advantageous, especially since each customer may have its own policy and security requirements (e.g., home customers may need only basic firewall protection whereas enterprise customers may need multiple security zones having different access controls).

The iEC2 architecture is highly scalable. The number of customer that may be supported is restricted only by resources available in the data center, not by design artifacts such as VLAN scalability issues.

The iEC2 architecture is low cost. The iEC2 architecture enables cloud service providers to rely on off-the-shelf devices for most devices such that new investment for the cloud service providers may be reduced. The iEC2 architecture enables cloud service providers to share their resources amongst different customers, because allocating physically separate networks and resources for different customers is cost prohibitive.

Although primarily depicted and described herein with respect to use of Ethernet (and, thus, use of MAC addresses) for providing the functions of the iEC2 architecture depicted and described herein, it will be appreciated that the functions of the iEC2 architecture depicted and described herein may be provided using any other suitable protocols and associated addresses.

Although primarily depicted and described herein with respect to use of specific mappings for providing the functions of the iEC2 architecture depicted and described herein, it will be appreciated that the functions of the iEC2 architecture depicted and described herein may be provided using fewer or more mappings, as well as different mappings. It will be further appreciated that, where one or more other suitable protocols are used for providing the functions of the iEC2 architecture depicted and described herein, the mappings depicted and described herein may be modified accordingly.

Figure 5:
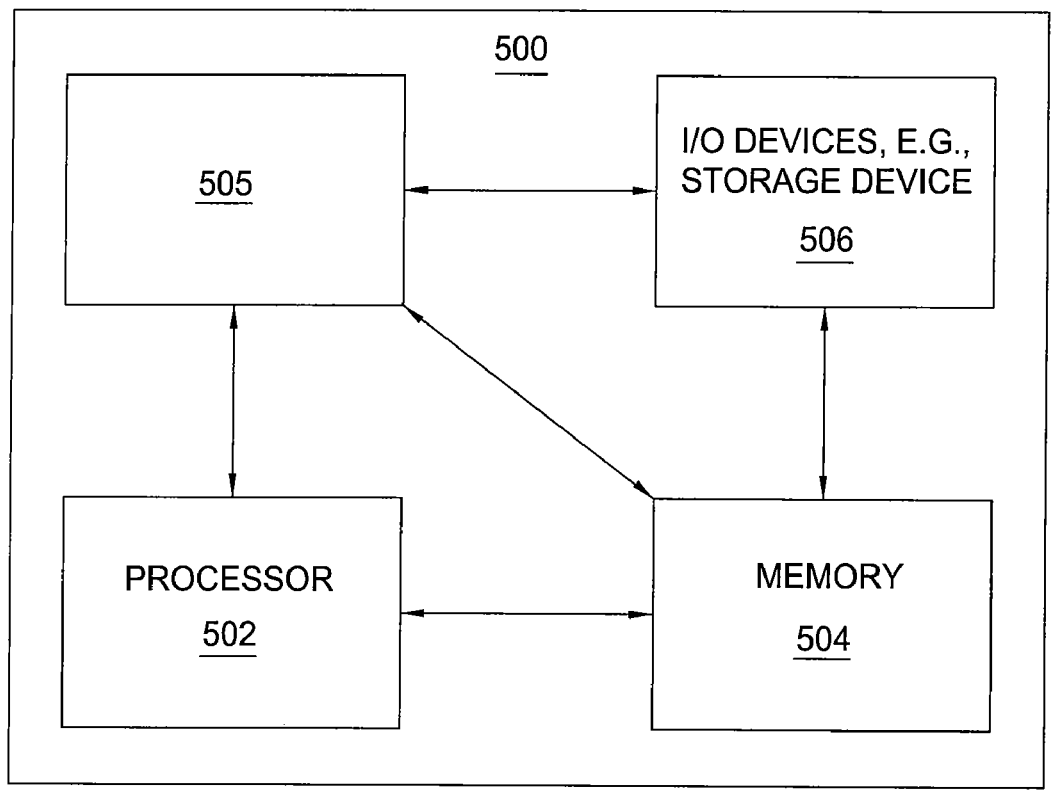
FIG. 5 depicts a high-level block diagram of a general-purpose computer suitable for use in performing the functions described herein.

FIG. 5 depicts a high-level block diagram of a computer suitable for use in performing the functions described herein. As depicted in FIG. 5, computer 500 includes a processor element 502 (e.g., a central processing unit (CPU) and/or other suitable processor(s)), a memory 504 (e.g., random access memory (RAM), read only memory (ROM), and the like), a cloud computing module 505, and various input/output devices 506 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It should be noted that functions depicted and described herein may be implemented in software and/or in a combination of software and hardware, e.g., using a general purpose computer, one or more application specific integrated circuits (ASIC), and/or any other hardware equivalents. In one embodiment, a cloud computing process 505 can be loaded into memory 504 and executed by processor 502 to implement the functions as discussed herein above. Thus, cloud computing process 505 (including associated data structures) can be stored on a computer readable storage medium, e.g., RAM memory, magnetic or optical drive or diskette, and the like.

It is contemplated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. A method for enabling use of a resource of a data center as an extension of a customer network of a customer, comprising:
   receiving, at a forwarding element (FE), a packet intended for a virtual machine hosted at an edge domain of the data center, wherein the edge domain supports a plurality of VLANs for a respective plurality of customer networks, wherein the packet comprises an identifier of the customer network and a MAC address of the virtual machine;
   determining a VLAN ID of the VLAN for the customer network in the edge domain using the identifier of the customer network and the MAC address of the virtual machine;
   updating the packet to include the VLAN ID of the VLAN for the customer network in the edge domain; and
   propagating the updated packet from the FE toward the virtual machine.

2. The method of claim 1, wherein determining the VLAN ID of the VLAN for the customer network in the edge domain comprises:
   accessing a memory on the FE; or
   initiating, toward a controller of the data center, a request for the VLAN ID of the VLAN for the customer network in the edge domain, and receiving the VLAN ID of the VLAN for the customer network in the edge domain.

3. The method of claim 1, wherein determining the VLAN ID of the VLAN for the customer network in the edge domain comprises:
   determining an identifier of the edge domain using the MAC address of the virtual machine; and
   determining the VLAN ID of the VLAN for the customer network in the edge domain using the identifier of the customer network and the identifier of the edge domain.

4. The method of claim 1, wherein the FE is associated with the edge domain of the data center at which the virtual machine is hosted.

5. The method of claim 4, wherein updating the packet to include the VLAN ID of the VLAN for the customer network in the edge domain comprises:
   if the received packet includes an existing VLAN ID, replacing the existing VLAN ID with the determined VLAN ID; or
   if the packet does not include an existing VLAN ID, inserting the determined VLAN ID into the packet.

6. The method of claim 4, wherein propagating the updated packet from the FE toward the virtual machine comprises:
   propagating the updated packet toward the virtual machine using the VLAN ID included in the updated packet and the MAC address of the virtual machine.

7. The method of claim 4, wherein the received packet comprises an outer header comprising an FE MAC address of the FE and an inner header comprising the MAC address of the virtual machine, wherein the method further comprises removing the outer header from the packet.

8. The method of claim 1, wherein the FE is a first FE associated with a first edge domain of the data center, wherein the edge domain at which the virtual machine is hosted is a second edge domain of the data center having a second FE associated therewith.

9. The method of claim 8, further comprising:
   determining a MAC address of the second FE using the MAC address of the virtual machine.

10. The method of claim 9, wherein determining the MAC address of the second FE comprises:
    determining an identifier of the second edge domain using the MAC address of the virtual machine; and
    determining the MAC address of the second FE using the identifier of the second edge domain.

11. The method of claim 9, wherein propagating the updated packet from the first FE toward the virtual machine comprises:
    propagating the updated packet from the first FE toward the second FE using the MAC address of the second FE.

12. The method of claim 11, wherein propagating the updated packet from the first FE toward the second FE using the MAC address of the second FE comprises:
    pre-pending the FE MAC address of the second FE to the updated packet;
    tunneling the updated packet toward the second FE using MAC-in-MAC tunneling.

13. The method of claim 1, wherein the FE is a first FE associated with the customer network, wherein the edge domain at which the virtual machine is hosted has a second FE associated therewith.

14. The method of claim 13, further comprising:
determining a MAC address of the second FE using the MAC address of the virtual machine.

15. The method of claim 13, wherein determining the MAC address of the second FE comprises:
determining an identifier of the edge domain using the MAC address of the virtual machine; and
determining the MAC address of the second FE using the identifier of the edge domain.

16. The method of claim 13, wherein propagating the updated packet from the first FE toward the virtual machine comprises:
propagating the updated packet from the first FE toward the second FE using the MAC address of the second FE.

17. The method of claim 16, wherein propagating the updated packet from the first FE toward the second FE using the MAC address of the second FE comprises:
pre-pending the FE MAC address of the second FE to the updated packet;
tunneling the updated packet toward the second FE using MAC-in-MAC tunneling.

18. The method of claim 1, further comprising:
determining a policy associated with the customer network using the identifier of the customer network; and
applying the determined policy to the packet prior to or while propagating the packet toward the virtual machine.

19. An apparatus for enabling use of a resource of a data center as an extension of a customer network of a customer, comprising:
a processor and a memory communicatively connected to the processor, the processor configured to:
receive, at a forwarding element (FE), a packet intended for a virtual machine hosted at an edge domain of the data center, wherein the edge domain supports a plurality of VLANs for a respective plurality of customer networks, wherein the packet comprises an identifier of the customer network and a MAC address of the virtual machine;
determine a VLAN ID of the VLAN for the customer network in the edge domain using the identifier of the customer network and the MAC address of the virtual machine;
update the packet to include the VLAN ID of the VLAN for the customer network in the edge domain; and
propagate the updated packet from the FE toward the virtual machine.

20. A method for enabling use of a resource of a data center as an extension of a customer network of a customer, comprising:
receiving, at a forwarding element (FE) associated with an edge domain of the data center, a packet intended for a virtual machine hosted in the edge domain of the data center, wherein the packet comprises an identifier of the customer network, an IP address of the virtual machine, and a MAC address of the virtual machine;
when the received packet includes a VLAN ID of the customer network within the edge domain, propagating the received packet toward the virtual machine using the VLAN ID of the customer network within the edge domain and the MAC address of the virtual machine;
when the received packet does not include a VLAN ID of the customer network within the edge domain:
determining a VLAN ID of the customer network within the edge domain using the MAC address of the virtual machine;
updating the packet to include the VLAN ID of the customer network within the edge domain; and
propagating the updated packet toward the virtual machine using the VLAN ID of the customer network within the edge domain and the MAC address of the virtual machine.

* * * * *